United States Patent [19]
Kay

[11] Patent Number: 5,851,615
[45] Date of Patent: Dec. 22, 1998

[54] TAMPER INDICATING SECURITY ITEM AND JOINING METHOD

[75] Inventor: Ralph Kay, Basingstoke, Great Britain

[73] Assignee: De la Rue International Limited, London, Great Britain

[21] Appl. No.: 860,663

[22] PCT Filed: Feb. 27, 1996

[86] PCT No.: PCT/GB96/00436

§ 371 Date: Aug. 7, 1997

§ 102(e) Date: Aug. 7, 1997

[87] PCT Pub. No.: WO96/27178

PCT Pub. Date: Sep. 6, 1996

[30] Foreign Application Priority Data

Mar. 2, 1995 [GB] United Kingdom .................... 9504145

[51] Int. Cl.⁶ ....................................................... B32B 3/00
[52] U.S. Cl. .......................... 428/40.1; 428/195; 428/201; 428/209; 428/423.1; 428/915
[58] Field of Search .................................. 428/40.1, 195, 428/201, 209, 423.1, 425.8, 457, 915

[56] References Cited

U.S. PATENT DOCUMENTS 4,608,288  8/1986  Spindler .
4,913,504  4/1990  Gallagher .
5,085,514  2/1992  Mallik et al. .
5,683,774  11/1997 Faykish et al. ........................ 428/40.1

FOREIGN PATENT DOCUMENTS

| | | |
|---|---|---|
| A 0 201 323 | 11/1986 | European Pat. Off. . |
| A 0 328 086 | 8/1989 | European Pat. Off. . |
| A 0 585 076 | 3/1994 | European Pat. Off. . |
| A 2 069 409 | 8/1981 | United Kingdom . |
| WO 91/18377 | 11/1991 | WIPO . |
| WO 92/16378 | 10/1992 | WIPO . |
| WO 93/08084 | 4/1993 | WIPO . |

Primary Examiner—Elizabeth Evans
Attorney, Agent, or Firm—Oliff & Berridge, PLC

[57] ABSTRACT

A tamper indicating security item such as a shrink wrap seal comprises a substrate including an optically variable effect generating structure such as an embossed hologram. Each surface of the substrate carries an adhesive having a strength such that after the substrate has been adhered to a surface it cannot be removed without damaging the optically variable effect generating structure.

20 Claims, 1 Drawing Sheet

TAMPER INDICATING SECURITY ITEM AND JOINING METHOD

This invention relates to a tamper indicating security item and a joining method and is particularly useful in packaging applications.

The market penetration of optically variable effect generating devices such as holographic security devices is increasing and new ways to use such devices are constantly being developed. Holographic security devices require sophisticated equipment for their manufacture and this combined with their visual effectiveness makes them highly desirable as anticounterfeiting and antitamper features.

Holographically imaged labels can be provided on a variety of security articles. Films exhibiting holographic images or other light diffracting patterns are available for the packaging industry as plain wrapping films.

To prevent and/or allow the detection of tampering with goods including fast moving consumer goods, many manufacturers have introduced tamper resistant or tamper indicating packing. For example, plastic seals are often shrunk over the closures of bottles to prevent or allow the detection of any tampering with the contents of the bottle.

Shrink sleeve or shrink wrap packaging is well known. The underlying principle behind this is that a mono-axially or biaxially orientated thermoplastic polymeric film is placed over the article to be protected as a loose fit. When the film is heated to above a certain temperature, the plastic shrinks as the strain imparted during the orientation process is released.

Smurfit Precision Labelling has recently introduced an holographic tamper evident shrink sleeve for use in the packaging industry. Here a type of shrink wrap film is made and this has a holographic band affixed to it which is perforated.

To open the protected closure, the shrink wrap film is removed: the removal action causes tearing along the line of perforations to cut the holographic device in two. Such films may be poly (vinyl chloride) or a polyester such as poly (ethylene terephthalate). It is also possible, however, to slit the sleeve elsewhere and remove the sleeve without damaging the holographic device.

Holographic tear tapes are also offered by Applied Holographics Ltd along with PP Payne Ltd.

Packaging material with an holographic pattern is disclosed in WO 93/08084 and holographic adhesive tape is disclosed in EP 585076A.

Transferable holographic packaging films are disclosed in GB-A-2069409.

Tamper evident holographic labels for adhering to a surface are also known in which when the upper layer is mechanically peeled away delamination at the interface between the metallic reflective coating and the finely embossed diffractive surface occurs. In such instances when the layers are separated, they cannot be recombined and the loss of such intimate layer contact means that the holographic effect is immediately, unexpectedly and irreversibly destroyed.

Polypropylene tamper evident labels can withstand the conditions required for hot lamination if the correct grade and surface bonding characteristics are employed, and because of their strength, polyester holographic labels are generally tamper resistant. However, they can be cut and removed and then used on counterfeit or tampered products although they can be treated or be provided with added layers to reduce this problem.

US Banknote Co (USBC) makes a polyester hologram and coats this on both sides with a hot melt adhesive. Then one of the adhesive layers is coated with a diamond pattern of a pressure sensitive adhesive ("psa"). This psa is used to hold the hologram in position when the core is labelled prior to the single ply poly(vinyl chloride) film being applied.

USBC has used the approach of adhering the hologram to the surface of the security printed plastic, for example by an automatic labelling machine, subsequent to which the single ply PVC laminating film is applied.

EP-A-0585076 illustrates a tape formed from an oriented base film of thermoplastic plastics material coated with a pressure sensitive adhesive composition on one surface and with a release agent on another surface and including a security device in the form of a hologram.

In accordance with the present invention, a heat shrink packaging material comprises a heat shrinkable film; and a tamper indicating security item comprising a substrate including a surface relief structure which generates an optically variable effect, each surface of the substrate carrying an adhesive layer the item being secured to the film by one of the adhesive layers, each adhesive layer having a strength such that after the substrate has been adhered to a surface it cannot be removed without damaging the optically variable effect.

We have devised a new type of security item which has a particular use in packaging by providing a strong bond between the packaging material and the packaged article and which, when broken, inevitably damages or destroys part or all of the optically variable effect generating structure. A particular example is tubular, shrink wrap seals.

Typically, the adhesive used on one surface of the substrate will be different from that used on the other surface. However, this is not essential.

One of the adhesives, for example for adhering the substrate to a packaging film may be the one of an hot melt adhesive, an heat activatable adhesive, a pressure sensitive adhesive and a polymeric laminating film.

The other adhesive, for example for adhering the substrate to the article may be one of an hot melt adhesive, a heat activatable adhesive, a pressure sensitive adhesive, and a hot melt adhesive cross linkable in nature such as UV cured acrylic or epoxy. This is especially useful if windows are employed i.e. demetallised holograms or clear refractory hot stamping holographic foils. UV curing is effected whilst the adhesive is in the melt phase.

All these adhesives achieve strong bonds to the substrate and surfaces.

Generally, these adhesive materials will be transparent when actively bonded. However, one or both adhesives could be provided with luminescent materials or be tinted and translucent while one of the adhesives could even be opaque provided the optically variable effect was visible through the other.

In one preferred embodiment, the one adhesive is selected from a hot melt adhesive or a pressure sensitive adhesive, and the other adhesive is a hot melt adhesive.

In some cases, at least one of the adhesives includes a marking material such as a visible dye, a luminescent material, and/or a magnetic material. This can provide additional security. For example, secondary detection is possible if a luminescent material such as a phosphorescent chemical is included while visual dyes and magnetic materials can be used to provide codes.

In a preferred embodiment, the substrate has on one surface a pressure sensitive adhesive protected prior to use by a detachable release layer and on the other surface an heat activatable or hot melt adhesive layer material or solid UV cationic epoxy which melts and then cures with UV. Curing will occur immediately after the shrink stage.

The adhesive coatings are generally intended to be evenly coated but patterns of adhesive such as a fine grid could be used. In this case, the adhesives could be printed by screen printing means.

The surface relief structure which generates a optically variable light effect could be an holographic effect generating structure which is intended to include also all types of white light diffracting surface relief patterns formed in a polymeric medium in which the patterned surface is reflectively or refractively coated with an image enhancing composition such as a thin layer of aluminium or a thin layer of magnesium fluoride or zinc sulphide. Such coatings and equivalents are well known in the art and examples may be found in EP 201323A. The aluminium or other films could be provided in a continuous form or fine halftone dot formation as described in EP 328086A.

The visual appearance resulting from such diffracting structures may thus be of a regular diffraction grating, a mosaic of diffracting gratings, a three dimensional holographic spatial effect image or the like. Such diffracting structures can be generated by holographic recording or electron beam generation. For example, the optically variable effect generating structure may generate an holographic effect at least in one visually identifiable area, the structure being formed by a fine surface profile formed in a transparent plastic film, the profile being reflectively coated.

On delamination the visual appearance will substantially change although if some layers are intact the delaminated portions may exhibit other coloured effects.

The surface relief pattern may be formed in the substrate or into a layer on the substrate. This could be achieved, for example, by using thermoplastic moulding methods using a nickel or other shim as an embossing tool. The additional layer could be a lacquer layer provided directly on the substrate or on an additional carrier.

The self-supporting plastics film may be poly(vinyl chloride), poly(propylene), poly(ethylene), poly(ethylene terephthalate) or other polyester, a polyacrylic or polyacrylate, poly(vinyldene chloride) or poly(styrene). Copolymers of the foregoing may also be used.

For some applications, suitable polymeric films may be axially orientated.

Thermoplastic embossable lacquer coatings carried on a polymeric carrier, e.g. PET, may be added to the above films.

It is preferred that the polymeric material be a transparent poly(propylene) film which has been diffractively embossed and coated with a thin film of aluminium.

Mono-axially orientated films have typical shrink characteristics of 55% in the traverse direction and 6% in the machine direction. There are a wide range of material thicknesses, e.g. 38 microns to 100 microns, reversion temperatures and other characteristics possible.

In use, one of the surfaces to which the substrate is bonded is the packaging film and the other the article to be packaged. In this context, the article may only be partially packaged. For example, a lid only of the article could be covered by a packaging film.

The packaging film may be a film selected from a biaxially orientated thermoplastic film or a monoaxially orientated thermoplastic film.

Typically, the packaging film is applied to the item and heat is applied, preferably as heated air such that the heat activatable surface of the hologram adjacent the article bonds to the article in the manner required for the operating of the invention.

An advantage of the present invention is that the (holographic) effect may be readily imparted to the packaged article and its presence can testify to the authenticity of the article.

When the packaging is removed, the (holographic) image will unexpectedly and immediately fail in a manner which cannot be reconstructed. Thus, any attempts to remove the packaging will leave an immediate trace.

The invention is particularly suitable for use in some embodiments for high capacity production packaging lines, for example the fast moving consumer goods sector. In other embodiments, individual packages of high value items may be prepared.

Such packaging may be used in the packaging of cylindrical containers such as polycarbonate bottles for beverages. In this instance, the removal of the packaging wrap will cause the hologram to fail.

The adhesive(s) can be activated in a variety of ways depending upon their nature and the manner in which they are incorporated into the item and/or packaging film/article.

In one particularly convenient embodiment in which a hot melt adhesive is used to bond the substrate to the article and a pressure sensitive adhesive is used to bond the substrate to the packaging film, heat is applied which simultaneously causes the film to shrink and at the same time causes the hot melt adhesive on the rear of the substrate to bond to the article.

A further advantage of the invention is that when wrappings are legitimately removed the (holographic) effect is destroyed so removing the potential that the discarded wrapper could be re-used.

The packaging film will typically be a plain transparent film but in some cases could itself carry an optically variable effect generating structure such as a holographic generating effect structure.

Tubes of biaxially orientated film may be made for shrink wrap purposes by firstly taking a film of thickness around 70 microns and forming a seam by heat welding, solvent bonding, ultrasonic welding or radio frequency bonding. Such films will generally be printed with a packing design by rotogravure or flexography and the holographic construction applied. For example, the holographic material may be applied by supplying it in a core having on one surface a non-tacky hot melt adhesive and a pressure sensitive adhesive on the other surface, this being protected by a releasable paper. In practice, the tamper evident strip or tape is applied to the packaging sheet while it is laid flat and this is then seamed into tubes from which shorter shrink-sleeves are cut.

Typically, the packaging film with shrinkable properties would be pre-printed to leave clear windows or tinted, opaque or other regions to correspond with desired viewing of the hologram.

The area of the packaging film which exhibits the optical variable effect could be overprinted with a transparent yellow lacquer so as to tint the diffractive appearance. Additionally, opaque white or other opaque coatings could be applied, for example in the manner taught in WO 92/16378. Visible and invisible printing may be used. Printed indicia and bar codes could also be added. In practice, the printed inks would be applied when the tubing was flat. At this time a tamper indicating security item in the form of a linear ribbon-like tape would be applied by, for example, hot lamination and the flat sheet formed into tubing by forming a seam. The tape could have a straight edge or a serrated or deckled edge.

Printing ink markings could be provided onto the inner surface of the holographic layers before the seal is shrunk into place. The shrunk seal would then not only exhibit the holographic effect but also visually display printing which being on the inaccessible side of the seal would be difficult to alter.

The print provided on the inner surface could be variable, for example to record batch numbers and be applied as toner or jetted ink or the like.

In order to seal the substrate to the article it would be typical to use a plastic for the substrate which did not deform below 150 degrees centigrade and to employ hot air jets for the bonding and optionally shrinking, which have a temperature of 120 degrees centigrade. Care must naturally be taken to ensure that the article is not itself damaged by a short exposure to the hot air.

In another embodiment, a strong plastic tear strip combined with perforations may be included along the line of the optically variable effect generating device bonded to it by the hot melt adhesive to allow the packaging to have a tear line.

Any attempt to peel off the wrapping film is likely to cause the weak layer between the reflective metal or other reflective coating and the diffractively profiled plastic to part irreversibly so immediately spoiling the visual appearance.

The heat activatable layer may alternatively be a resin or other material extruded, coated or otherwise bonded to the carrier film to which it is effectively permanently bonded. The bonding between the layers may be enhanced by the use of priming layers, electrical corona treatment or the like.

By arranging that the holographic device is bonded to the opposing surfaces, any attempt to delaminate is likely to cause the weaker interfacial bond within the hologram, i.e. between the diffracting surface and the reflective material to come apart in an unexpected, irreversible and thus tamper evident manner. Any attempt to reconstruct even a genuine packaging seal which has been tampered with is likely to be detected as the seal will be invalidated by the failure of the holographic or other optically variable security device.

Tamper evident holographically embossed material can be incorporated into the shrink sleeve product during manufacture. Strips of holographic material, e.g. width 5 to 20 mm, will be held in position along the shrink sleeve material by a self-adhesive layer. The other side of the material would be coated with a heat activatible adhesive, so that during heat shrink application the hologram is now bonded on both sides—to the sleeve and to the object. Attempted removal of the hologram will result in the destruction of the holographic image.

Solvent, extruded or water-based heat seal adhesives could be used. This adhesive activation temperature must be such that bonding occurs, but the process must be controlled so that the holographic layer is not damaged.

The incorporation of an optically variable microstructure within a shrink sleeve heightens the level of protection of the product against both counterfeiting and tampering. Registering the holographic image with a range of security printed features provides an integrated product ideally suited for brand and revenue protection.

As explained above, the substrate will typically be in the form of a tape or ribbon having a width of a few mm, e.g. 1–2 mm (termed a thread) upwards. Preferred widths are 15–25 mm to allow viewing of the optically variable effect and ease of manufacture. The term "tape" will be used hereafter to refer to a length of substrate of any width.

Some examples of tamper evident security items and methods according to the invention will now be described with reference to the accompanying drawings, in which.

Figure 1:
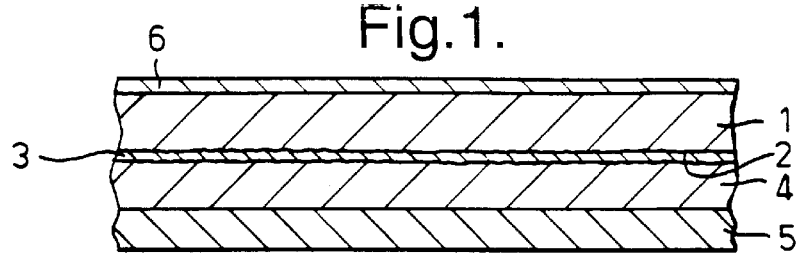
FIG. 1 is a schematic, cross-section through a first example of a tamper indicating security item (not to scale)

FIG. 1 illustrates a tamper evident embossed tape having a single ply based structure. The substrate comprises a polypropylene film 1 having a thickness in the range 25–50 microns and a width in the range typically 5–20 mm. One surface of the film 1 is embossed as shown at 2 with a holographic structure and this embossed surface is coated with a vacuum deposited layer of aluminium 3 having a thickness typically of 20 nm. The embossed surface of the film 1 is suitably treated, for example by corona discharge, so as to control the level of bonding to the aluminium layer 3. This bond should not be too strong so that it is tamper evident. A high performance (pressure sensitive) acrylic adhesive layer 4 having a thickness of 10–20 microns is applied to the aluminium layer 3 from a release coated silicone resin carrier 5. The release carrier 5 is typically paper and the carrier will have a weight typically in the range 50–80 gsm.

The other surface of the film 1 carries a hot melt or heat activatable adhesive layer 6 having a thickness in the range 10–20 microns.

In an alternative structure (not shown), it would be possible and may be desirable to employ the reverse situation whereby the aluminium 3 is coated with hot melt reactivatable adhesive whilst the substrate carrying the embossed layer 1 is laminated with high performance pressure sensitive acrylic adhesive on a silicone coated carrier.

Thus, in this case, the adhesive would be applied after removal of the release carrier to the inside of the heat shrinkable film and the hot melt on the aluminium profile would bond under application conditions to the article. The aluminium embossed profile would thus face the article.

Figure 2:
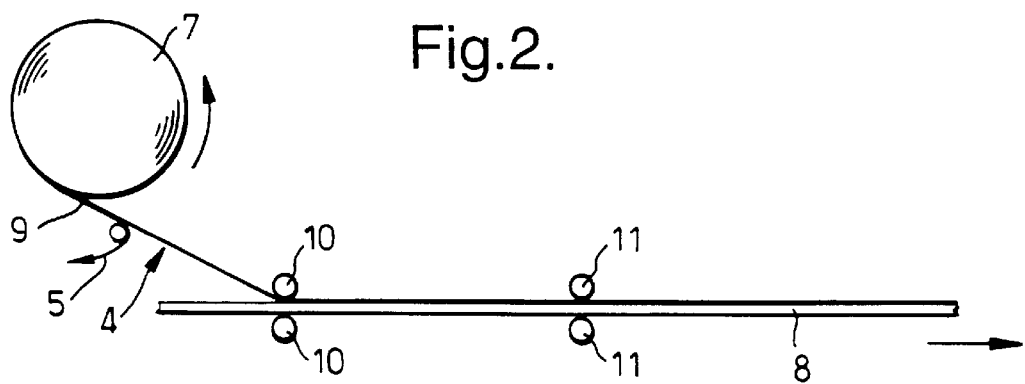
FIG. 2 illustrates a method for applying the item in FIG. 1 to a shrinkable film.

The tape shown in FIG. 1 will be formed in a long length of several hundred meters and will be stored on a reel 7 as shown in FIG. 2. FIG. 2 illustrates the continuous in-line application of the material shown in FIG. 1 onto a shrinkable film 8. The tape 9 is unwound from the reel 7 and initially the release layer 5 is peeled away revealing the pressure sensitive adhesive 4. The partially delaminated tape 9 is then fed between a pair of nip rollers 10 between which is also fed the moving film 8. The two components are arranged to be fed at substantially the same speed and the rollers 10 form a nip so that the tape 9 is pressed onto the film 8 thus activating the adhesive 4. The consolidated material is fed on between a pair of rollers 11 to a take-up roller (not shown). It will be appreciated that the adhesive layer 6 is uppermost in FIG. 2 and remains inactive.

The resultant, consolidated material is then steadily formed into a continuous tube by bending and welding it (for example by using solvent bonding) to form a seam. This is then cut to suitable lengths and pre-shrunk by placing each length 12 over a former 13 (FIG. 3) and subjecting the material 12 to hot air to form a loose fitting sleeve. The holographic tape is shown at 14. The mould 13 is suitably treated so that it will not adhere to the adhesive layer 6.

The pre-shrunk tube is then ready for use as a security seal. In use, the tube is placed over an article to be secured, for example the top of a bottle. Once placed over the bottle top, the tube is subjected to hot air which activates the adhesive 6 so that not only does the tube 12 shrink closely around the bottle top but in addition the adhesive 6 adheres the tape 14 to the bottle top.

If any attempt is made to remove the shrink wrapped tube 12 from the bottle top, this will destroy or at least damage the embossed hologram within the tape 14, for example by partially delaminating the tape structure since the adhesive bond between the tape 14 and the bottle top due to the adhesive layer 6 is stronger than the interlaminate bonds. The pressure sensitive adhesive 4 is also sufficient to prevent the film 8 being delaminated from the tape.

Figure 4:
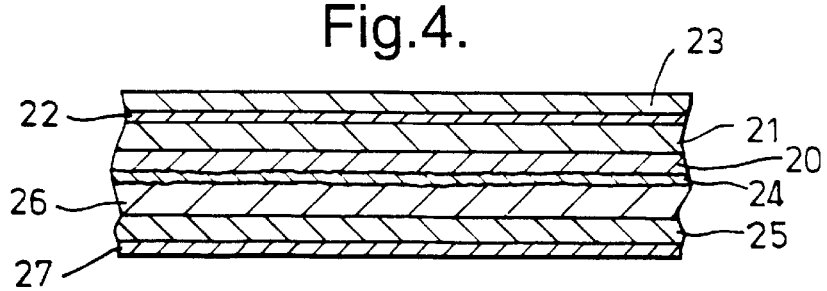
FIG. 4 is a view similar to FIG. 1 but of a second example.

A second example of a tape is shown in FIG. 4. In this example, the hologram is provided by embossing the lacquer layer 20 on a release treated carrier layer, for example polyethylene or polypropylene 21. The other surface of the layer 21 carries a pressure sensitive adhesive 22 covered by a release paper 23.

The embossed lacquer layer 20 is covered by a vacuum deposited layer of aluminium or the like 24 and this is joined to a thin, clear carrier layer 25 of for example polyethylene by a pressure sensitive adhesive layer 26. The other surface of the carrier layer 25 is provided with a hot melt or heat reactivatable adhesive 27.

This tape can be used in exactly the same way as the tape shown in FIG. 1. The adhesive 22 will bond to the packaging film and the adhesive 27 will bond to the product. In this case, however, when the seal which is formed when the tube has been shrunk wrapped onto the product is removed, the tape will split between the carrier layer 21 and the embossed lacquer layer 20. This means that the exposed surface on the product is holographic and is non-tacky which is preferred in some applications. This layer cannot be removed from a product due to the strength of the adhesive 22.

Figure 3:
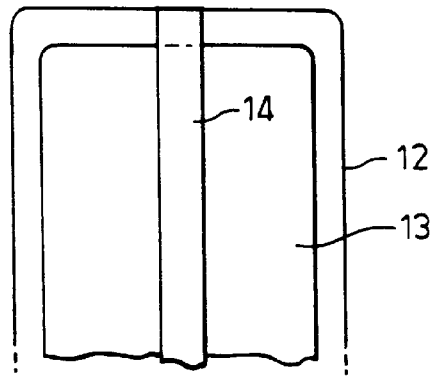
FIG. 3 illustrates the formation of a tube ready for securement.

In the examples shown in FIGS. 1 to 3, the hologram will be viewed through the film 8, and the pressure sensitive adhesive 4, both of which will need to be transparent or at least translucent in regions where the hologram is to be viewed. In the FIG. 4 example, the hologram will be viewed, in situ, through the packaging film, the adhesive 22, the release carrier 21, and the embossed lacquer layer 21, all of which will need to be transparent in regions where the hologram is to be viewed.

I claim:

1. A heat shrink packaging material comprising a heat shrinkable film; and a tamper indicating security item comprising a substrate including a surface relief structure which generates an optically variable effect, each surface of the substrate carrying an adhesive layer the item being secured to the film by one of the adhesive layers, each adhesive layer having a strength such that after the substrate has been adhered to a surface it cannot be removed without damaging the optically variable effect.

2. A material according to claim 1, wherein the adhesive used on one surface of the substrate is different from that used on the other surface.

3. A material according to claim 1, wherein one of the adhesives is chosen from the group comprising an hot melt adhesive, an heat activatable adhesive, a pressure sensitive adhesive and a polymeric laminating film.

4. A material according to claim 3, wherein the other adhesive is chosen from the group comprising an hot melt adhesive, a heat activatable adhesive, a pressure sensitive adhesive, and a hot melt adhesive cross linkable in nature such as UV cured acrylic or epoxy.

5. A material according to claim 4, wherein the one adhesive is selected from a hot melt adhesive or a pressure sensitive adhesive, and the other adhesive is a hot melt adhesive.

6. A material according to claim 1, wherein the adhesives are transparent.

7. A material according to claim 1, wherein at least one of the adhesives includes a marking material such as a visible dye, a luminescent material, and/or a magnetic material.

8. A material according to claim 7, wherein the marking material defines a code.

9. A material according to claim 1, wherein the optically variable effect is a hologram.

10. A material according to claim 1, wherein the optically variable effect generating structure comprises a surface relief pattern in the substrate.

11. A material according to claim 1, wherein the optically variable effect generating structure comprises a surface relief pattern in a lacquer layer on the substrate.

12. A material according to claim 11, wherein the lacquer layer is provided on a carrier.

13. A material according to claim 11, wherein the lacquer layer is bonded to the substrate by an adhesive, preferably a pressure sensitive adhesive.

14. A material according to claim 1, wherein the substrate is self-supporting.

15. A material according to claim 14, wherein the substrate is a plastics film.

16. A material according to claim 15, wherein the plastics film is chosen from the group comprising poly(vinyl chloride), poly(propylene), poly(ethylene), poly(ethylene terephthalate) or other polyester, a polyacrylic or polyacrylate, poly(vinyldene chloride) or poly(styrene).

17. A material according to claim 1 wherein the film is selected from a biaxially orientated thermoplastic film or a monoaxially orientated thermoplastic film.

18. A material according to claim 1, wherein the film is in the form of heat shrinkable tubing.

19. An article joined to a material according to claim 1, via one of the adhesive layers.

20. An article according to claim 19, wherein the article is partially or completely packaged by the film.

* * * * *